(12) United States Patent
Oliver

(10) Patent No.: US 9,592,769 B1
(45) Date of Patent: Mar. 14, 2017

(54) TOW PACKAGE CARGO SUPPORT

(71) Applicant: James Oliver, Hazard, KY (US)

(72) Inventor: James Oliver, Hazard, KY (US)

(*) Notice: Subject to any disclaimer, the term of this patent is extended or adjusted under 35 U.S.C. 154(b) by 0 days.

(21) Appl. No.: 14/946,183

(22) Filed: Nov. 19, 2015

(51) Int. Cl.
*B60R 9/06* (2006.01)
*B60P 1/64* (2006.01)

(52) U.S. Cl.
CPC .............. *B60R 9/06* (2013.01); *B60P 1/6409* (2013.01)

(58) Field of Classification Search
CPC ........................................................ B60R 9/08
See application file for complete search history.

(56) References Cited

U.S. PATENT DOCUMENTS

| | | | | |
|---|---|---|---|---|
| 4,800,471 A * | 1/1989 | Lippert | .................... | B60Q 1/44 340/479 |
| 5,752,636 A | 5/1998 | Manley | | |
| 6,070,926 A | 6/2000 | Hardin | | |
| 6,116,631 A * | 9/2000 | Logan | ..................... | B60D 1/50 280/43 |
| 6,698,810 B1 * | 3/2004 | Lane | ........................ | B60P 3/40 296/26.02 |
| 7,243,966 B1 * | 7/2007 | Sheldon | .................... | B60P 3/40 224/519 |
| 7,967,336 B2 * | 6/2011 | Biseli | ........................ | B60R 9/06 180/219 |
| 8,480,149 B2 | 7/2013 | Durand | | |
| 2003/0111502 A1 * | 6/2003 | DuPlantis | ................. | B60R 9/06 224/519 |
| 2004/0245795 A1 | 12/2004 | Hansen | | |
| 2011/0024472 A1 * | 2/2011 | Thompson | .............. | B60R 9/042 224/500 |
| 2011/0024473 A1 | 2/2011 | Weiss | | |

* cited by examiner

*Primary Examiner* — John Walters
*Assistant Examiner* — James Triggs
(74) *Attorney, Agent, or Firm* — The Keys Law Firm PLLC

(57) ABSTRACT

A tow package cargo support for providing a structural support for items which extend beyond the back edge of a vehicle cargo bed and includes a support body which provides a substantially U shaped frame, an attachment beam which allows for the attachment of the support body to a vehicle tow package, and two vertical side extensions which extend up vertically from opposing sides of the support body. The support body additionally includes a vertical body extension which connects the cargo support and attachment beam. In one embodiment, the tow package cargo support may be employed with an auxiliary bed sized and shaped to be placed with one end resting on the cargo bed of a vehicle and the other end on the support body, providing an extended, contiguous bed surface in conjunction with to the cargo bed of the vehicle.

10 Claims, 3 Drawing Sheets

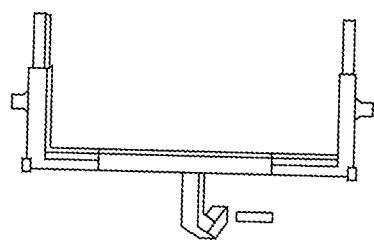 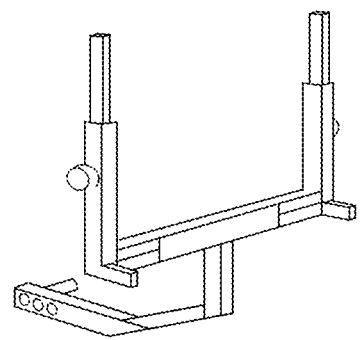
Fig. 5A                    Fig. 5b

TOW PACKAGE CARGO SUPPORT

BACKGROUND OF THE INVENTION

Field of the Invention

This invention relates generally to vehicle accessories and, more particularly, to a hitch mounted structure for extending the length of a cargo bed on a vehicle.

Description of the Prior Art

The use of vehicles with cargo capacity, such as pick-up trucks, vans and sports utility vehicles ("SUV") to transport materials is well known. Such vehicles often additionally include a tow package that enables the attachment of a trailer, again often for transporting materials. A problem which still exists, however, for loads too large to fit entirely in a cargo bed of a vehicle, or in the desired size of trailer, a portion thereof often extends outward from the back or sides of the transporting vehicle (or trailer). Thus, there remains a need for a cargo support apparatus which attaches to the tow package of the vehicle to effectively extend the length of a vehicle cargo space. It would be helpful if such a tow package cargo support included a reinforced bed structure providing additional planar cargo space of the vehicle. It would be additionally desirable for such a tow package cargo support included a netting for providing a backstop for transported loads.

The Applicant's invention described herein provides for a tow package cargo support adapted to extend the length of a vehicle cargo space through a hitch mounted support structure. The primary components in Applicant's tow package cargo support are a support body, an auxiliary bed, and a securing net. When in operation, the tow package cargo support attaches to the tow package of a transporting vehicle to allow oversized loads which would normally extend outward from the back of the transporting vehicle to be contained. As a result, many of the limitations imposed by prior art structures are removed.

SUMMARY OF THE INVENTION

A tow package cargo support for providing a structural support for items which extend beyond the back edge of a vehicle cargo bed (or otherwise extend beyond the rear of the vehicle). The tow package cargo support includes a support body which provides a substantially U shaped frame, an attachment beam which allows for the attachment of the support body to a vehicle tow package, and two vertical side extensions which extend up vertically from opposing sides of the support body. The support body additionally includes a vertical body extension which connects the cargo support and attachment beam. In one embodiment, the tow package cargo support may be employed with an auxiliary bed sized and shaped to be placed with one end resting on the cargo bed of a vehicle and the other end on the support body, providing an extended, contiguous bed surface in conjunction with to the cargo bed of the vehicle.

It is an object of this invention to provide a cargo support apparatus which attaches to the tow package of the vehicle to effectively extend the length of a vehicle cargo space.

It is another object of this invention to provide a tow package cargo support which includes a reinforced bed structure providing additional planar cargo space of the vehicle.

It is yet another object of this invention to provide a tow package cargo support which includes a netting for providing a backstop for transported loads.

These and other objects will be apparent to one of skill in the art.

BRIEF DESCRIPTION OF THE DRAWINGS

FIG. 5A is a back perspective view of a tow package cargo support built in accordance with an alternate embodiment of the present invention.

FIG. 5B is a side perspective view of a tow package cargo support built in accordance with an alternate embodiment of the present invention.

DETAILED DESCRIPTION OF THE INVENTION

Figure 1:
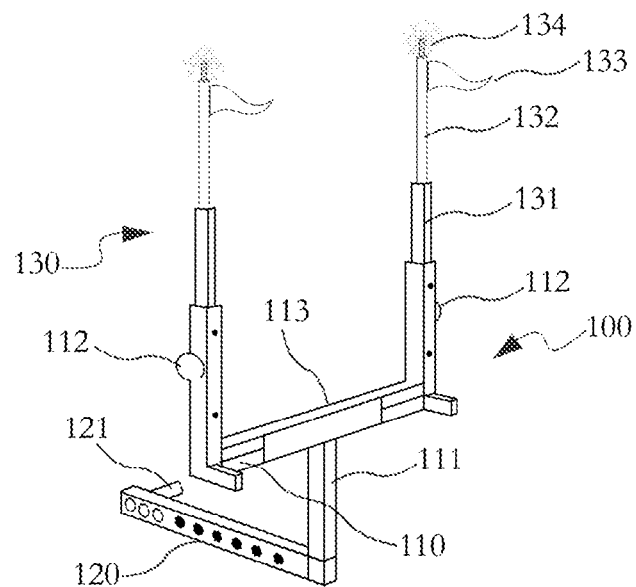
FIG. 1 is a side perspective view of a tow package cargo support built in accordance with the preferred embodiment of the present invention.

Referring now to the drawings and in particular FIG. 1, a tow package cargo support 100 is shown having a support body 110, an attachment beam 120, and a left side extension and a right side extension (collectively, 130). The support body 110 is the main structural member of the tow package cargo support 100 and is defined as rigid, a U shaped structure which additionally includes a vertical body extension 111. In one embodiment, disposed on each side of the U shaped structure of the support body 110 is a caution/brake light 112. Each of the caution/brake lights 112 are wired to a towing vehicle's electrical system as conventional trailers are so as to enable the lights 112 to mimic the operation of the vehicle's brake lights. The center structure 113 of the support body 110, spanning horizontally between the opposing sides provides a horizontal stand on which materials extending beyond the cargo bed of a vehicle can rest.

The attachment beam 120 is a rigid, elongated member that is attached to the end of the body extension 111 extending therefrom perpendicularly. The attachment beam 120 is attachable to the tow package (or hitch) of a vehicle with a pin 121, enabling the tow package cargo support 100 to be attached to, and towed by, a vehicle.

The side extensions 130 telescopically extend from the each upper end of the support body 110. Each side extension 130 is defined by a rigid base extension 131, a rigid secondary extension 132, a flag 133 disposed on the secondary extension 132 and a top light 134 disposed on the secondary extension 132. Each of the top lights 134 are wired to the towing vehicle's electrical system as conventional trailers are so as to enable the top lights 134 to mimic the operation of the vehicle's brake lights.

Figure 2A:
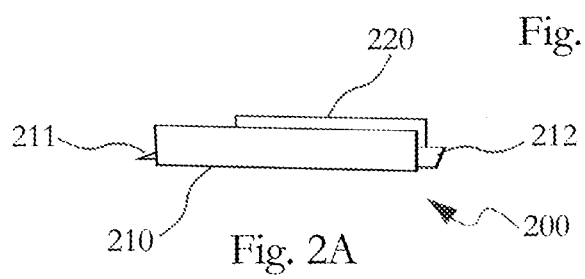
FIG. 2A is a side perspective view of the auxiliary bed of a tow package cargo support built in accordance with an embodiment of the present invention.
Figure 2B:
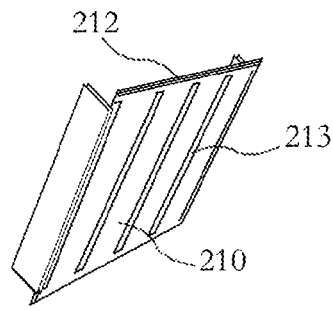
FIG. 2B is a bottom perspective view of the auxiliary bed of a tow package cargo support built in accordance with an embodiment of the present invention.

Referring now to FIGS. 2A and 2B, an auxiliary bed 200 is defined as rigid body having a planar floor panel 210 and two side walls 220. The floor panel 210 has a first end 211 and a second end 212, and includes a plurality of ribs 213 in order to improve the strength thereof. The auxiliary bed 200 is sized and shaped to be placed with first end 211 resting on the cargo bed of a vehicle (not shown) and the second end 212 on the center structure of support body, providing an extended, contiguous bed surface in conjunction with to the cargo bed of the vehicle.

Figure 3:
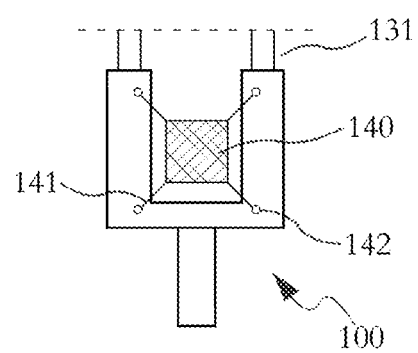
FIG. 3 is a back elevational view of a tow package cargo support built in accordance with an embodiment of the present invention with the securing net attached thereto.

Referring now to FIGS. 1 and 3, the support body 100 may additionally include a cargo net 140 attached thereto. The cargo net 140 includes elastic attachment cables 141 which extend out therefrom and attach to attachment hooks 142 on the back of the support body 110. The cargo net 140 provides a secured backstop that prevents materials in the cargo bed of a vehicle and resting on the support body 110 (or auxiliary bed on the support body 110) from sliding off behind the tow package cargo support 100.

Figure 4A:
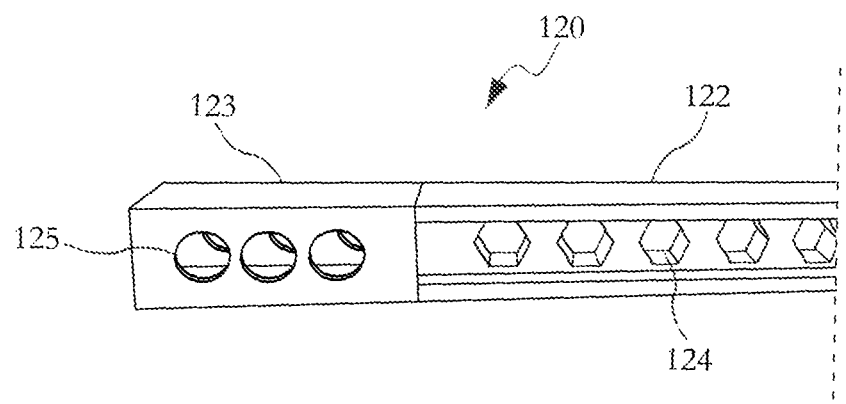
FIG. 4A is a side perspective view of the attachment beam of a tow package cargo support built in accordance with an embodiment of the present invention.
Figure 4B:
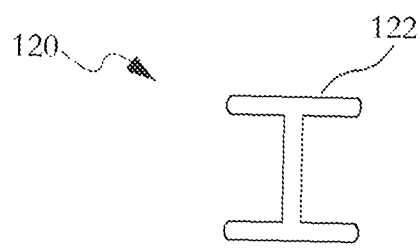
FIG. 4B is a front elevational view of a cross section of the attachment beam of a tow package cargo support built in accordance with an embodiment of the present invention.

Referring now to FIGS. 1, 4A and 4B, the attachment beam 120 includes an elongated portion 122 and an attachment portion 123. The elongated portion 122 is an I-beam design and includes a plurality of apertures 124 which decrease the overall weight without comprising strength. The attachment portion 123 includes three pin holes 125 sized to fit the pin 121. In this regard, to secure the tow package cargo support 100 to a vehicle's tow package, one of the pin holes 125 is aligned with the hole on the hitch and the pin 121 is inserted.

Referring now to FIGS. 5A and 5B, an alternate embodiment of the tow package cargo support 300 is shown. The alternate embodiment employs an alternate attachment beam 310 defined by an angled arm.

It is contemplated that in some embodiments, the body extension is structured in two, telescopically disposed pieces to enable the height of the center structure to be selectively adjusted.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A tow package cargo support for attaching behind a vehicle, comprising:
    a rigid support body having an elongated center section configured to provide a horizontal stand suitable to support materials thereon and two elongated vertical sections, wherein said center section extends between the two vertical sections such that the support body forms a U shaped structure;
    an attachment beam integral with said support body and having a first end, wherein said first end is adapted to be selectively connected to and towed by a conventional tow package of a vehicle;
    said support body positioned relative to said attachment beam such that when the first end is connected to a vehicle, the center section is positioned so as to support materials which extend beyond the rear of the vehicle; and
    a cargo net which is attachable to said support body, wherein said support body and cargo net are adapted such that the cargo net provides a backstop in a space enclosed by the center section and two vertical sections that prevents materials resting on the support body from sliding off when attached to said support body.

2. The tow package cargo support of claim 1, wherein said support body additionally includes a vertical body extension which connects the center section with the attachment beam.

3. The tow package cargo support of claim 1, additionally comprising a separate side extension which extends vertically from each of the vertical sections.

4. The tow package cargo support of claim 3, wherein said side extensions each include a top light which is configured to mimic the operation of brake lights of a vehicle to which the attachment beam is connected.

5. The tow package cargo support of claim 1, wherein said support body includes at least one caution/brake light which is configured to mimic the operation of brake lights of a vehicle to which the attachment beam is connected.

6. The tow package cargo support of claim 1, additionally comprising an auxiliary bed having a rigid planar floor panel and adapted to be positioned between the center section and the rear of a vehicle to which the attachment beam is connected.

7. The tow package cargo support of claim 6, wherein the auxiliary bed is defined as rigid body having a planar floor panel and two side walls.

8. The tow package cargo support of claim 1, wherein the attachment beam includes an elongated portion defining an I-beam includes a plurality of apertures which decrease the overall weight without comprising strength.

9. The tow package cargo support of claim 1, wherein the attachment beam includes an angled portion and a horizontal portion.

10. The tow package cargo support of claim 3, wherein said side extensions extend telescopically from the vertical sections.

\* \* \* \* \*